United States Patent
Yamada

(10) Patent No.: US 10,498,921 B2
(45) Date of Patent: Dec. 3, 2019

(54) ELECTRONIC IMPRINTING DEVICE THAT AFFIXES IMPRINT DATA TO DOCUMENT DATA

(71) Applicant: Kyocera Document Solutions Inc., Osaka (JP)

(72) Inventor: Muneki Yamada, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/884,421

(22) Filed: Jan. 31, 2018

(65) Prior Publication Data

US 2018/0255200 A1     Sep. 6, 2018

(30) Foreign Application Priority Data

Mar. 1, 2017   (JP) .................................. 2017-038005

(51) Int. Cl.
| | | |
|---|---|---|
| H04N 1/40 | (2006.01) | |
| H04N 1/32 | (2006.01) | |
| H04N 1/00 | (2006.01) | |
| G06K 9/00 | (2006.01) | |
| H04N 1/387 | (2006.01) | |

(52) U.S. Cl.
CPC ..... H04N 1/32133 (2013.01); G06K 9/00442 (2013.01); H04N 1/0044 (2013.01); H04N 1/3871 (2013.01); G06K 2209/01 (2013.01); H04N 2201/0082 (2013.01); H04N 2201/3235 (2013.01); H04N 2201/3236 (2013.01); H04N 2201/3271 (2013.01)

(58) Field of Classification Search
None
See application file for complete search history.

(56) References Cited

U.S. PATENT DOCUMENTS

| | | | |
|---|---|---|---|
| 2009/0073476 A1* | 3/2009 | Torikoshi | H04N 1/00236 358/1.13 |
| 2009/0141952 A1 | 6/2009 | Saito et al. | |
| 2015/0116784 A1* | 4/2015 | Nakayama | H04N 1/00334 358/3.28 |
| 2016/0219164 A1* | 7/2016 | Noguchi | H04N 1/00336 |

FOREIGN PATENT DOCUMENTS

| | | |
|---|---|---|
| CN | 101093476 A | 12/2007 |
| CN | 103729341 A | 4/2014 |

* cited by examiner

*Primary Examiner* — Henok Shiferaw
(74) *Attorney, Agent, or Firm* — James Judge

(57) ABSTRACT

An electronic imprinting device includes a display, an operation unit, a recognition processing unit, a storage unit, and an imprint processing unit. The display performs a display. The operation unit accepts an operation of a user. The recognition processing unit recognizes a character included in first document data and detects a guide character that indicates an imprinting position. The storage unit stores imprint data representing an imprint. The imprint processing unit, when the recognition processing unit recognizes that the first document data includes the guide character, generates second document data as data to which an imprint image represented by the imprint data is affixed at a position of the guide character, the second document data including a content of the first document data.

13 Claims, 12 Drawing Sheets

FIG. 11

| No. | Page | Delete | Edit | Position |
|-----|------|--------|------|----------|
| 1 | 1 | Delete | Edit | (x1,y1) |
| 2 | 1 | Delete | Edit | (x2,y2) |
| 3 | 2 | Delete | Edit | (x3,y3) |
| 4 | 2 | Delete | Edit | (x4,y4) |
| 5 | 3 | Delete | Edit | (x5,y5) |
| 6 | 3 | Delete | Edit | (x6,y6) |

Electronic imprint editing i1

Please impress your seal.
Name ○○ Smith
Name △△ Suzuki

[<<Previous Page] [Next Page>>] [Select] [Cancel] [OK]

ELECTRONIC IMPRINTING DEVICE THAT AFFIXES IMPRINT DATA TO DOCUMENT DATA

INCORPORATION BY REFERENCE

This application is based upon, and claims the benefit of priority from, corresponding Japanese Patent Application No. 2017-038005, filed in the Japanese Patent Office on Mar. 1, 2017, and the entire contents of which are incorporated herein by reference.

BACKGROUND

Unless otherwise indicated herein, the description in this section is not prior art to the claims in this application and is not admitted to be prior art by inclusion in this section.

As a proof of a document confirmation and approval, there are cases where a signature is appended to or a stamp (a signet and a seal) is impressed on a document. A person who imprints is, for example, a person in charge, an administrator, a document creator, and a document recipient. An imprinted document is usually an important document. Therefore, there is a case where the imprinted document is digitized. When the imprinted document is digitized, procedures in the following (1) to (3) are performed. (1) Printing a document; (2) Imprinting on the printed document; and (3) Digitizing the document with the imprint with a scanner. However, these procedures cost a work to digitize the imprinted document. Therefore, there is a case where imprint data (an electronic seal) is directly put on the document data. Such a process is sometimes referred to as electronic imprinting. There is proposed the following technique to prevent the electronic imprinting from being performed without permission.

Specifically, there is proposed an impressing device that displays an image on a display panel, reads an image of a subject in contact with the display panel as a subject image, associates first identification information for identifying a first finger of a user of a display reading unit with a first imprint of the user and stores the first identification information and the first imprint, determines whether a finger in the subject image read while an electronic document is displayed is the first finger or not based on the first identification information, detects position information that indicates a position where the first finger is in contact with the electronic document displayed on the display panel when the finger in the subject image is determined to be the first finger, and impresses a first imprint corresponding to the first identification information at a position indicated by the position information. This configuration seeks to ensure a finger authentication before impressing without a scanner for finger authentication.

SUMMARY

An electronic imprinting device according to one aspect of the disclosure includes a display, an operation unit, a recognition processing unit, a storage unit, and an imprint processing unit. The display performs a display. The operation unit accepts an operation of a user. The recognition processing unit recognizes a character included in first document data and detects a guide character that indicates an imprinting position. The storage unit stores imprint data representing an imprint. The imprint processing unit, when the recognition processing unit recognizes that the first document data includes the guide character, generates second document data as data to which an imprint image represented by the imprint data is affixed at a position of the guide character, the second document data including a content of the first document data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 11 illustrates an exemplary editing screen according to the one embodiment.

DETAILED DESCRIPTION

Figure 1:
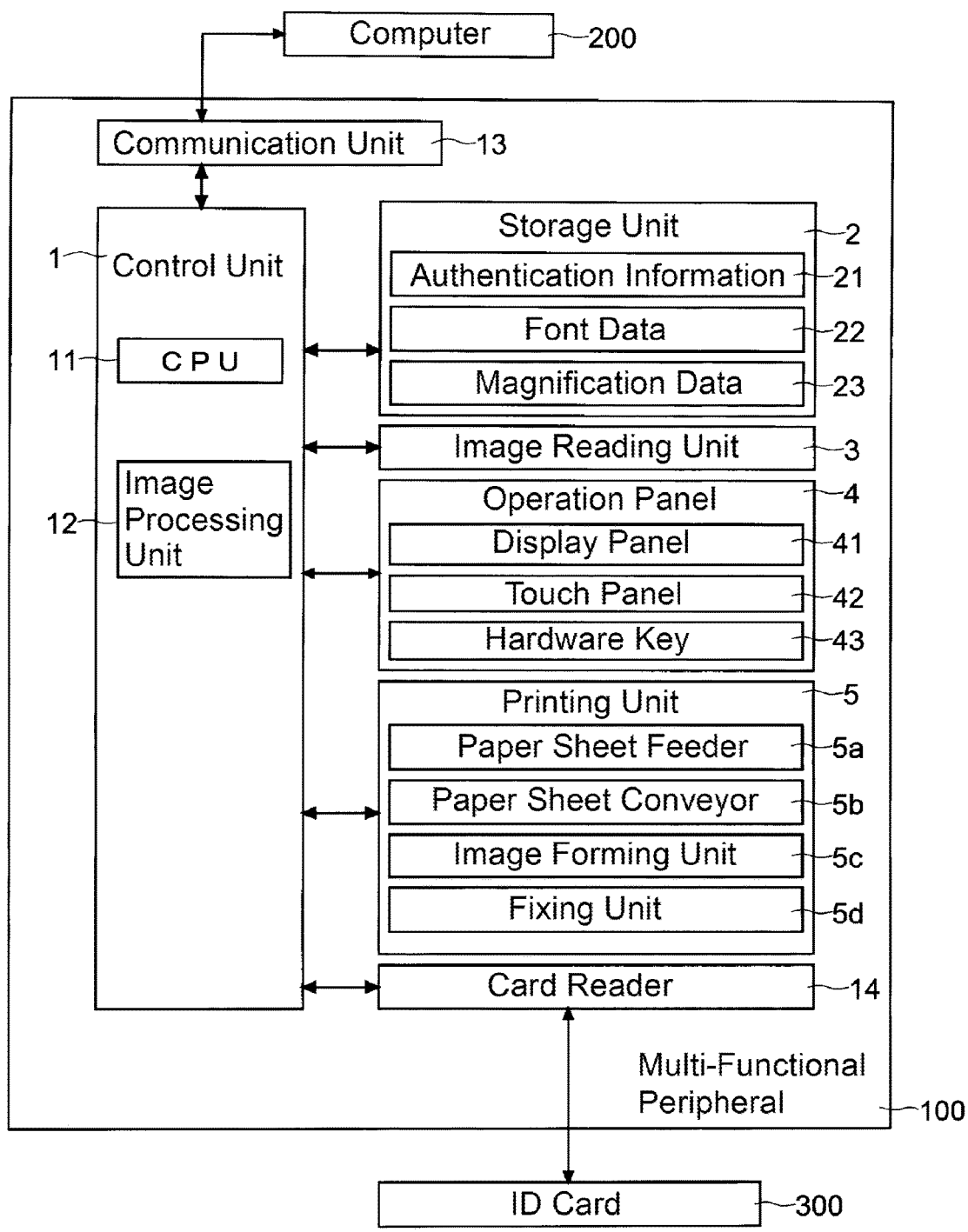
FIG. 1 illustrates an exemplary multifunctional peripheral according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an electronic imprinting device according to the disclosure using FIGS. 1 to 15. As the electronic imprinting device, a multifunctional peripheral 100 will be described as an example. The multifunctional peripheral 100 is also an image forming apparatus. However, the respective elements, such as the configuration and the arrangement described in this embodiment do not limit the scope of the disclosure and are only simple description examples.

Outline of Multifunctional Peripheral 100

First, an outline of the multifunctional peripheral 100 according to the embodiment will be described using FIG. 1. FIG. 1 illustrates an exemplary multifunctional peripheral 100 according to the embodiment.

The multifunctional peripheral 100 includes a control unit 1 and a storage unit 2. The control unit 1 controls respective units of the multifunctional peripheral 100. The control unit 1 includes a CPU 11 and an image processing unit 12. The CPU 11 performs an operation and a process regarding the control. The image processing unit 12 performs a process regarding image data. The storage unit 2 includes storage devices, such as a ROM, a RAM, and a HDD, to store programs for control and various kinds of data.

The multifunctional peripheral 100 includes an image reading unit 3. The control unit 1 causes the image reading unit 3 to read a set document. The image reading unit 3 generates image data of the document.

The control unit 1 is communicatively connected to an operation panel 4. The operation panel 4 includes a display panel 41 (equivalent to a display), a touch panel 42 (equivalent to an operation unit), and a hardware key 43 (equivalent to the operation unit). The control unit 1 controls a display of the display panel 41. The control unit 1 causes the display panel 41 to display a screen and an image. For example, the control unit 1 causes the display panel 41 to display an image for operation. The image for operation includes a button, a software key, a tab, and an icon. Based on an output of the touch panel 42, the control unit 1 recognizes the operated image for operation. The control unit 1 recognizes the operated hardware key 43. Thus, the operation panel 4 accepts an operation of a user. The control unit 1 recognizes an operation content made on the operation panel 4. The control unit 1 causes the display panel 41 to perform screen switching corresponding to the operated image for operation and hardware key 43. The control unit 1 controls the multifunctional peripheral 100 so as to operate according to the setting.

The multifunctional peripheral 100 includes a printing unit 5. The printing unit 5 includes a paper sheet feeder 5a, a paper sheet conveyor 5b, an image forming unit 5c, and a fixing unit 5d. The control unit 1 causes the paper sheet feeder 5a to supply the paper sheets one by one in a print job. The control unit 1 causes the paper sheet conveyor 5b to convey the paper sheets. The control unit 1 causes the image forming unit 5c to form a toner image based on the image data. The control unit 1 causes the image forming unit 5c to transfer the toner image onto the conveyed paper sheet. The image forming unit 5c is capable of color printing. The control unit 1 causes the fixing unit 5d to fix the toner image onto the paper sheet. The paper sheet conveyor 5b discharges the printed paper sheet to an outside of the multifunctional peripheral 100.

The multifunctional peripheral 100 includes a communication unit 13. The communication unit 13 communicates with a computer 200, such as a PC and a server. The communication unit 13 includes a connector and a communication circuit for communication. The communication unit 13 is configured to transmit/receive data to/from the computer 200. The communication unit 13 receives print data transmitted from the computer 200. The control unit 1 causes the printing unit 5 to print based on the received print data.

Authentication of User

Figure 2:
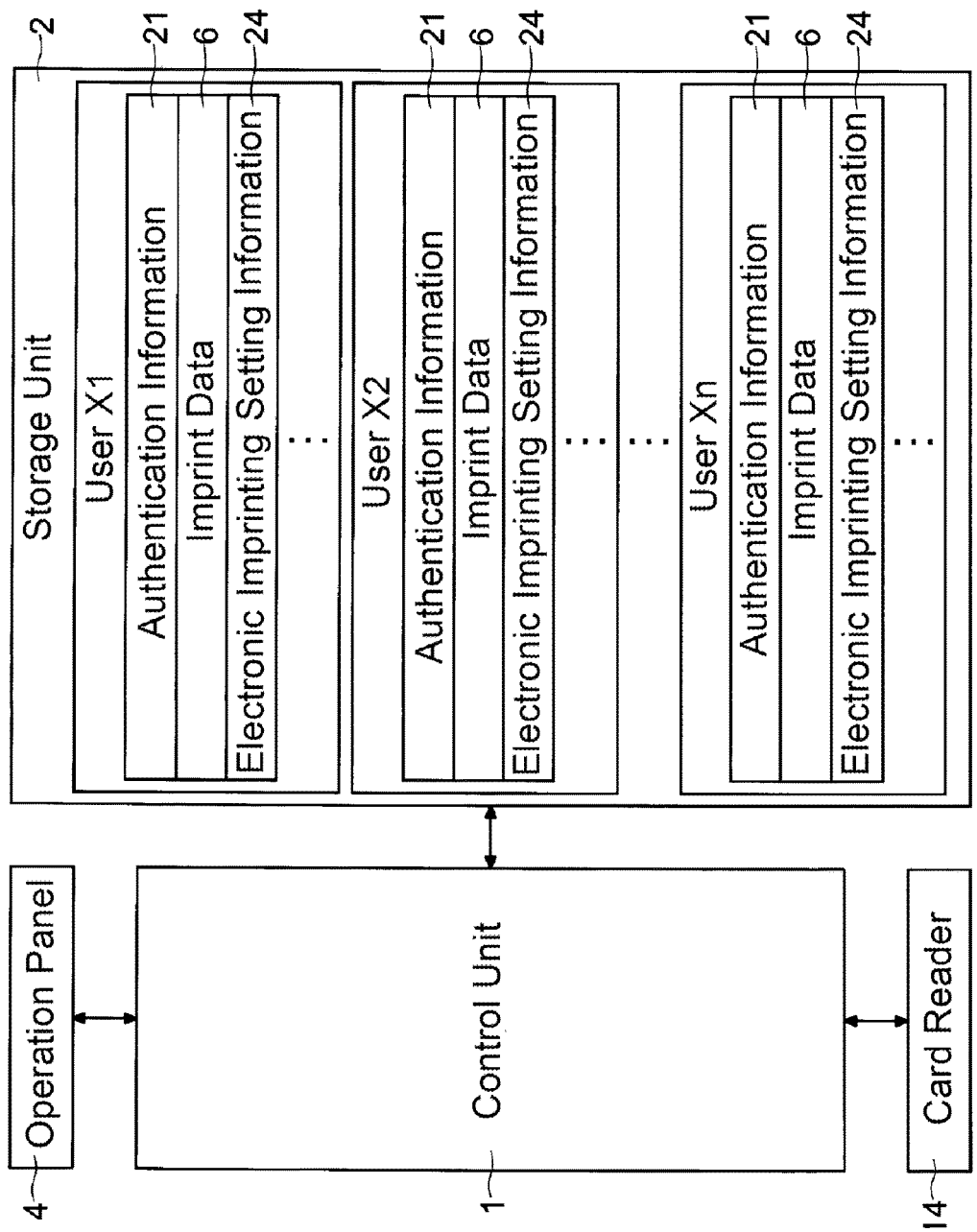
FIG. 2 illustrates a drawing for describing an exemplary authentication in the multifunctional peripheral according to the one embodiment.

Next, an exemplary authentication of a user in the multifunctional peripheral 100 according to the embodiment will be described using FIG. 2. FIG. 2 illustrates a drawing for describing the exemplary authentication in the multifunctional peripheral 100 according to the embodiment.

The multifunctional peripheral 100 has an authentication function. The authentication function is a function to manage a user of the multifunctional peripheral 100. The operation panel 4 accepts a setting whether the authentication function is used or not. While use of authentication function is being selected, only a permitted user can use the multifunctional peripheral 100.

The storage unit 2 preliminary stores authentication information 21 of a person who is permitted to use. The authentication information 21 of the respective users is registered in the storage unit 2. For example, an administrator of the multifunctional peripheral 100 performs a registration operation. The authentication information 21 of a user can be input to the operation panel 4. The storage unit 2 nonvolatilely stores the input authentication information 21. Alternatively, the communication unit 13 may be caused to receive the authentication information 21 from the computer 200. In this case, the storage unit 2 stores the authentication information 21 received by the communication unit 13. The authentication information 21 is defined for each user. The authentication information 21 of one user includes information for identifying the user, such as a user name, a user ID, and a password.

A person who attempts to be authenticated to log in inputs his or her own authentication information 21 into the multifunctional peripheral 100. When his or her own authentication information 21 is input to the multifunctional peripheral 100, the authentication information 21 can be input into the operation panel 4 (equivalent to an authentication information input unit). In the multifunctional peripheral 100, inputting the user name and the password is demanded. Input of another kind of information may be demanded. The user operates an on-screen keyboard screen displayed on the operation panel 4. The touch panel 42 accepts the input of the user name and the password. The control unit 1 recognizes the input user name and password. The authentication of the user may be performed using an ID card 300 (see FIG. 1). In this case, the respective users have the ID cards 300. The ID card 300 stores the authentication information 21 of the card holder. When logging in, the user causes a card reader 14 (see FIG. 1, equivalent to the authentication information input unit) to read the ID card 300. The card reader 14 reads out the authentication information 21 stored in the ID card 300. Reading out inputs the authentication information 21 into the multifunctional peripheral 100.

The control unit 1 (equivalent to an authentication unit) confirms whether the input authentication information 21 matches the authentication information 21 preliminarily stored in the storage unit 2 or not. The control unit 1 authenticates a user corresponding to the matched authentication information 21 as a user of the multifunctional peripheral 100. The control unit 1 authenticates the user attempting to log in based on the authentication information 21 input into the authentication information input unit.

When the input authentication information 21 and the stored authentication information 21 match, the control unit 1 permits the login.

When permitting the login, the control unit 1 causes the operation panel 4 to be in a login state from a logout state. The login state is a state where the operation panel 4 can accept operation. In the login state, a setting regarding a job, such as copying and transmitting, can be performed. A job execution start command can be performed. When the job execution start command is made in the login state (when a start key is operated), the control unit 1 causes the job to start.

When the input authentication information 21 and the stored authentication information 21 do not match, the control unit 1 does not permit the login. When the login is not permitted, the control unit 1 keeps the operation panel 4 in the logout state. In the logout state, the operation panel 4 does not accept the operation of the user except for the input of the authentication information 21. The operation panel 4 does not accept the job setting and the job execution start command. Therefore, in the logout state, the job setting and execution cannot be performed. After the job completion or when a predetermined time passes after the last operation has been made on the operation panel 4, the control unit 1 automatically causes the operation panel 4 to be in the logout state (an automatic logout).

Registration of Imprint Data 6

Figure 3:
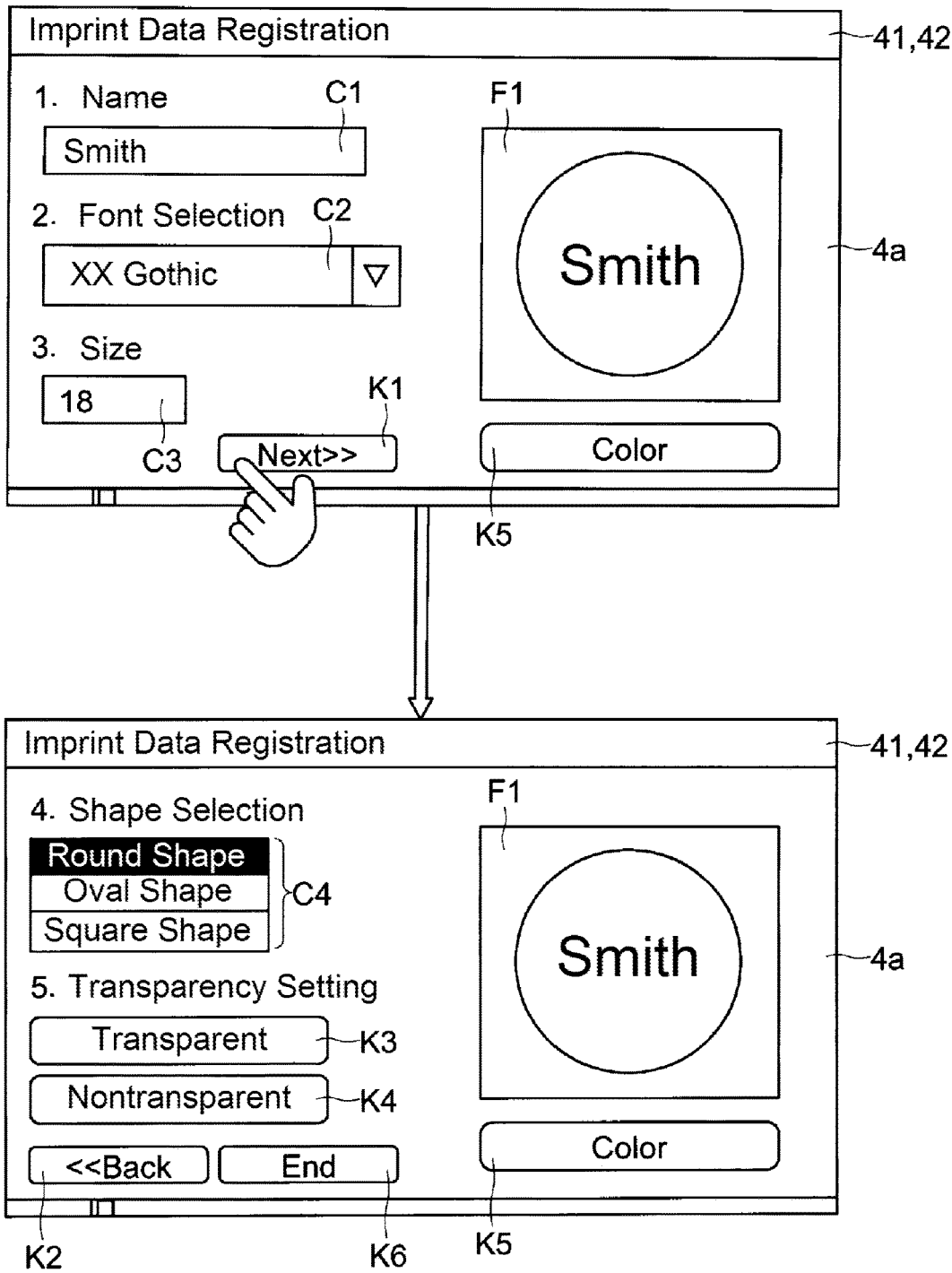
FIG. 3 illustrates an exemplary imprint creation screen according to the one embodiment.

Next, an exemplary registration of the imprint data 6 according to the embodiment will be described using FIGS. 2 and 3. FIG. 3 illustrates an exemplary imprint creation screen 4a according to the embodiment.

The respective users can register the imprint data 6. The imprint is an impression mark of a seal, a signet, and a stamp. The imprint data 6 is data that represents the imprint affixed to document data with the electronic imprinting. The imprint data 6 is image data that represents the imprint. Operating the operation panel 4 ensures registering the imprint data 6. When a predetermined operation is performed in the login state, the control unit 1 causes the display panel 41 to display an imprint creation screen 4a.

The imprint creation screen 4a is a screen to create and register the imprint data 6. The imprint creation screen 4a has two screens. Operating a next key K1 and a back key K2 ensures moving back and forth on each screen. The first screen of the imprint creation screen 4a includes a name entry field C1, a font selection field C2, and a size entry field C3. The second screen of the imprint creation screen 4a includes a shape selection field C4, a transparency key K3, and a nontransparency key K4. The name entry field C1, the font selection field C2, the size entry field C3, the shape selection field C4, the transparency key K3, and the nontransparency key K4 ensure creating the imprint data 6 that represents a desired imprint image.

When the name entry field C1 and the size entry field C3 are operated, the control unit 1 causes the display panel 41 to display the on-screen keyboard. The on-screen keyboard causes the touch panel 42 to accept inputs of a name and a size. Not only the size of an entire imprint, but also a thickness of a frame border of the imprint may be settable. Each of a length in a longitudinal direction and a length in a lateral direction of the imprint may be settable.

When the font selection field C2 is operated, the control unit 1 causes the display panel 41 to display a pull-down menu. The user selects a desired font from the pull-down menu. The storage unit 2 stores a plurality of font data 22 (see FIG. 1). Operating the shape selection field C4 ensures setting a shape of the frame border of the imprint. The transparency key K3 and the nontransparency key K4 ensure selecting whether to make an inside of the frame border transparent or not. Thus, the touch panel 42 accepts the setting regarding the name, the font, the size, the shape and the transparency of the imprint.

The seal (the signet and the stamp) is usually impressed in a vermilion color. Therefore, a color of a character and the frame border are in the vermilion color by default. As illustrated in FIG. 3, a color key K5 to set a color of the character and the frame border may be located on the imprint creation screen 4a. Operating the color key K5 ensures the user setting the color of the character and the frame border of the imprint to a desired color. For example, the color of the character and the frame border can be set to black.

The imprint creation screen 4a includes an imprint display area F1. The imprint display area F1 displays the imprint corresponding to the setting on the imprint creation screen 4a. For example, when a square shape is selected in the shape selection field C4, the control unit 1 changes the frame border of the imprint to be displayed into the square shape. When an end key K6 is operated, the control unit 1 recognizes that the creation of the imprint data 6 is completed. When the end key K6 is operated, the control unit 1 causes the storage unit 2 to nonvolatilely store the created (set) imprint data 6 (image data).

As illustrated in FIG. 2, the storage unit 2 stores the imprint data 6 for each user. In other words, the imprint data 6 is stored in the storage unit 2 by being associated with the user. The storage unit 2 may store the plurality of imprint data 6 for one user. For example, the control unit 1 handles the imprint data 6 registered by the user last as the default imprint data 6.

Flow of Processing Document Data

Figure 4:
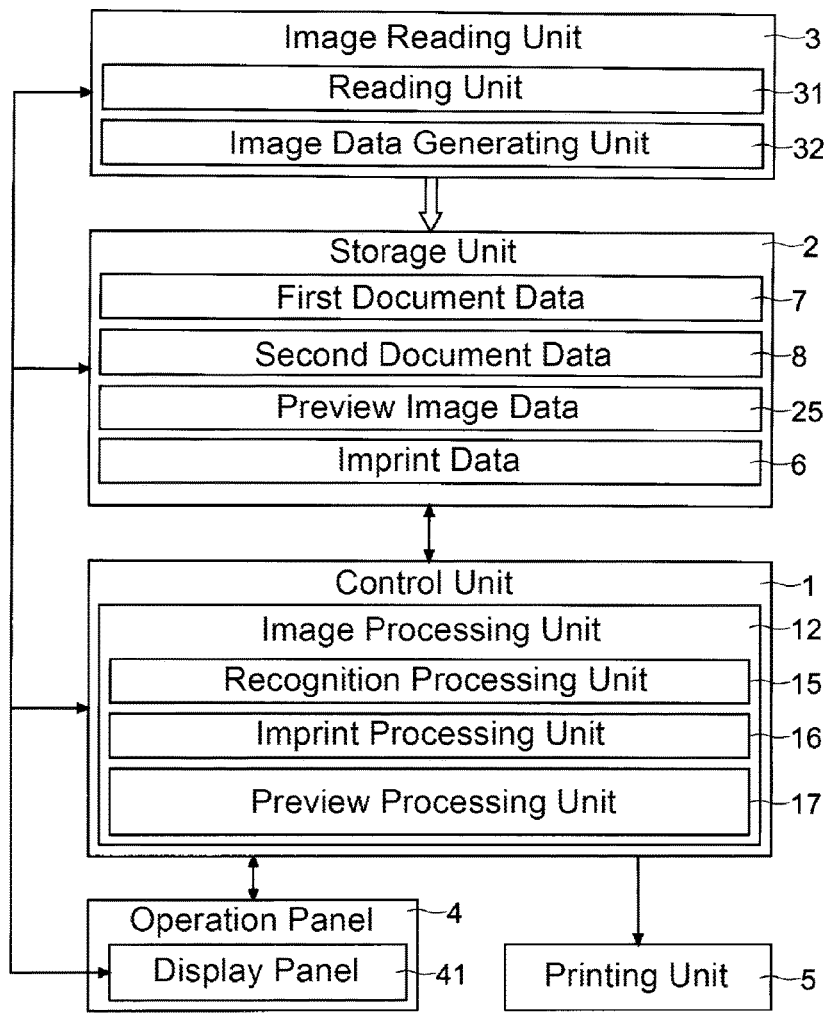
FIG. 4 illustrates a drawing to describe an exemplary process of document data with the multifunctional peripheral according to the one embodiment.

Next, an exemplary flow of processing document data in the multifunctional peripheral 100 according to the embodiment will be described using FIG. 4. FIG. 4 illustrates a drawing to describe the exemplary processing of document data with the multifunctional peripheral 100 according to the embodiment.

When a job is executed, document data is used. In the multifunctional peripheral 100, the document data is image data. The document data includes first document data 7 and second document data 8 that is the first document data 7 to which the imprint data 6 is automatically affixed.

In a copy job and a scan transmitting job, image data obtained by document reading of the image reading unit 3 is the first document data 7. As illustrated in FIG. 4, the image reading unit 3 includes a reading unit 31 and an image data generating unit 32. The reading unit 31 includes a light source, a lens, and an image sensor. The image data generating unit 32 generates image data based on an analog image signal output by the reading unit 31. The image data generating unit 32 performs an A/D conversion and a necessary correction. The image data generated by the image data generating unit 32 is stored in the storage unit 2 as the first document data 7. In a box job, the image data nonvolatilely stored in the storage unit 2 is used. In this case, the first document data 7 is already stored in the storage unit 2.

As illustrated in FIG. 4, the control unit 1 (the image processing unit 12) includes a recognition processing unit 15, an imprint processing unit 16, and a preview processing unit 17. The recognition processing unit 15 recognizes a character included in the first document data 7. The recognition processing unit 15 performs an OCR process (an optical character recognition process) to the first document data 7. The recognition processing unit 15 recognizes the character, a symbol, and a numeral included in the first document data 7 (the image data). The recognition processing unit 15 detects a guide character 9 that indicates an imprint position based on the detection result (the details will be described later).

The control unit 1 (the imprint processing unit 16) generates the second document data 8 based on the first document data 7. Specifically, the second document data 8 is data that copied the first document data 7. The imprint processing unit 16 attaches the imprint image of the imprint data 6 onto the guide character 9 in the copied data. That is, the imprint processing unit 16 generates image data, which is the first document data 7 to which the imprint data 6 is affixed, as the second document data 8 (the details will be described later).

The preview processing unit 17 generates preview image data 25. The preview processing unit 17 generates the preview image data 25 based on the second document data 8. The control unit 1 causes the display panel 41 to display a preview image i1 based on the preview image data 25. The preview image i1 shows a job result of the second document data 8. A total count of pixels of one page is more than a total count of pixels of the display panel 41. The preview processing unit 17 generates the preview image data 25 by sampling the pixels of the second document data 8 (the image data). In other words, the preview processing unit 17 generates the preview image data 25 by reducing the second document data 8. The generated preview image data 25 is stored in the storage unit 2.

The recognition processing unit 15, the imprint processing unit 16, and the preview processing unit 17 may be located as hardware (a circuit). The recognition processing unit 15, the preview processing unit 17, and the imprint processing unit 16 may be achieved by operation performed by the CPU 11 and the image processing unit 12 based on software (a program).

Basic Flow of Automatic Electronic Imprinting

Figure 5:
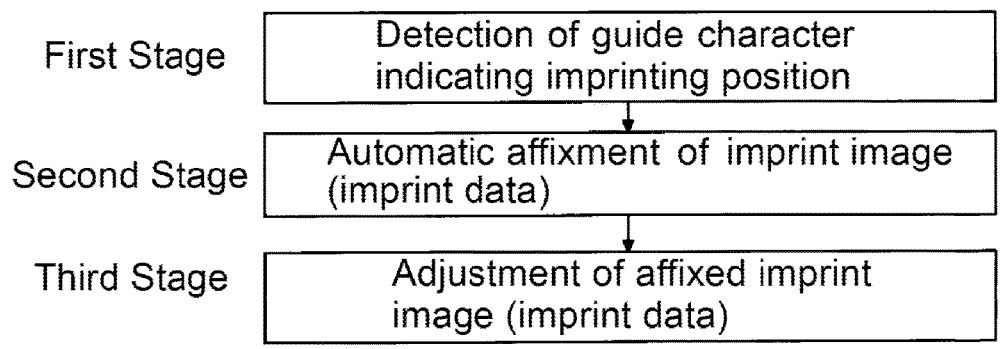
FIG. 5 illustrates an exemplary basic flow of automatic electronic imprinting with the multifunctional peripheral according to the one embodiment.

Next, an exemplary basic flow of automatic electronic imprinting with the multifunctional peripheral 100 according to the embodiment will be described using FIG. 5. FIG. 5 illustrates the exemplary basic flow of the automatic electronic imprinting with the multifunctional peripheral 100 according to the embodiment.

In the multifunctional peripheral 100, the imprint data 6 can be automatically affixed to the document data in job execution. In other words, the multifunctional peripheral 100 (the control unit 1) automatically performs the electronic imprinting. Then, the multifunctional peripheral 100 (the control unit 1) automatically generates the second document data 8 to which the imprint data 6 is affixed. As a result, a work (an operation) to attach the imprint is no longer necessary. As illustrated in FIG. 3, the basic flow of the automatic electronic imprinting is as follows.

(A first stage) Detection of the guide character 9 indicating the imprinting position.
(A second stage) Automatic affixment of the imprint data 6.
(A third stage) Adjustment of the affixed the imprint data 6.

After completion of the third stage, the job can be executed based on the second document data 8.

Flow of Process in Job Execution

Figure 6:
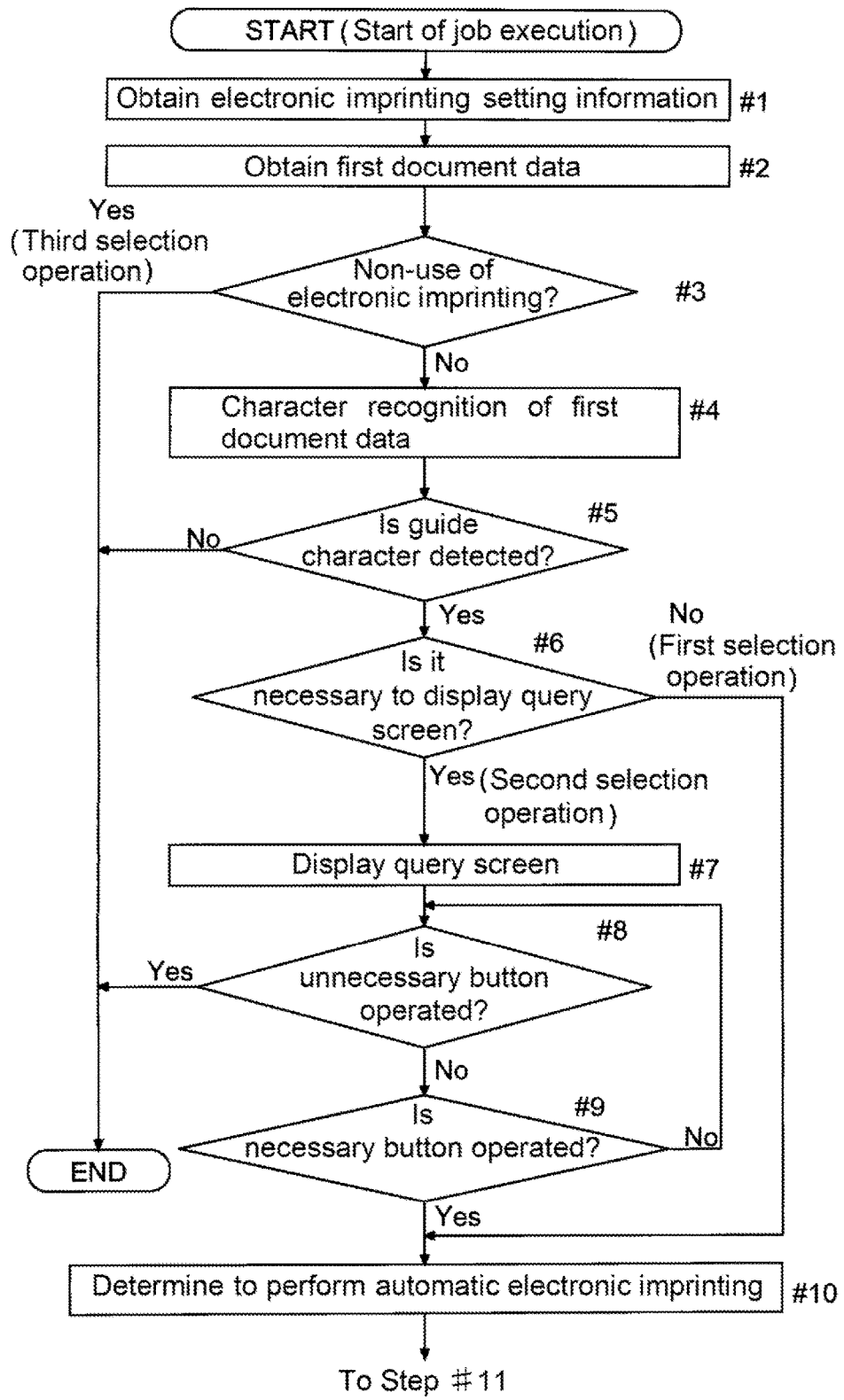
FIG. 6 illustrates an exemplary flow of a process in a job execution with the multifunctional peripheral according to the one embodiment.
Figure 7:
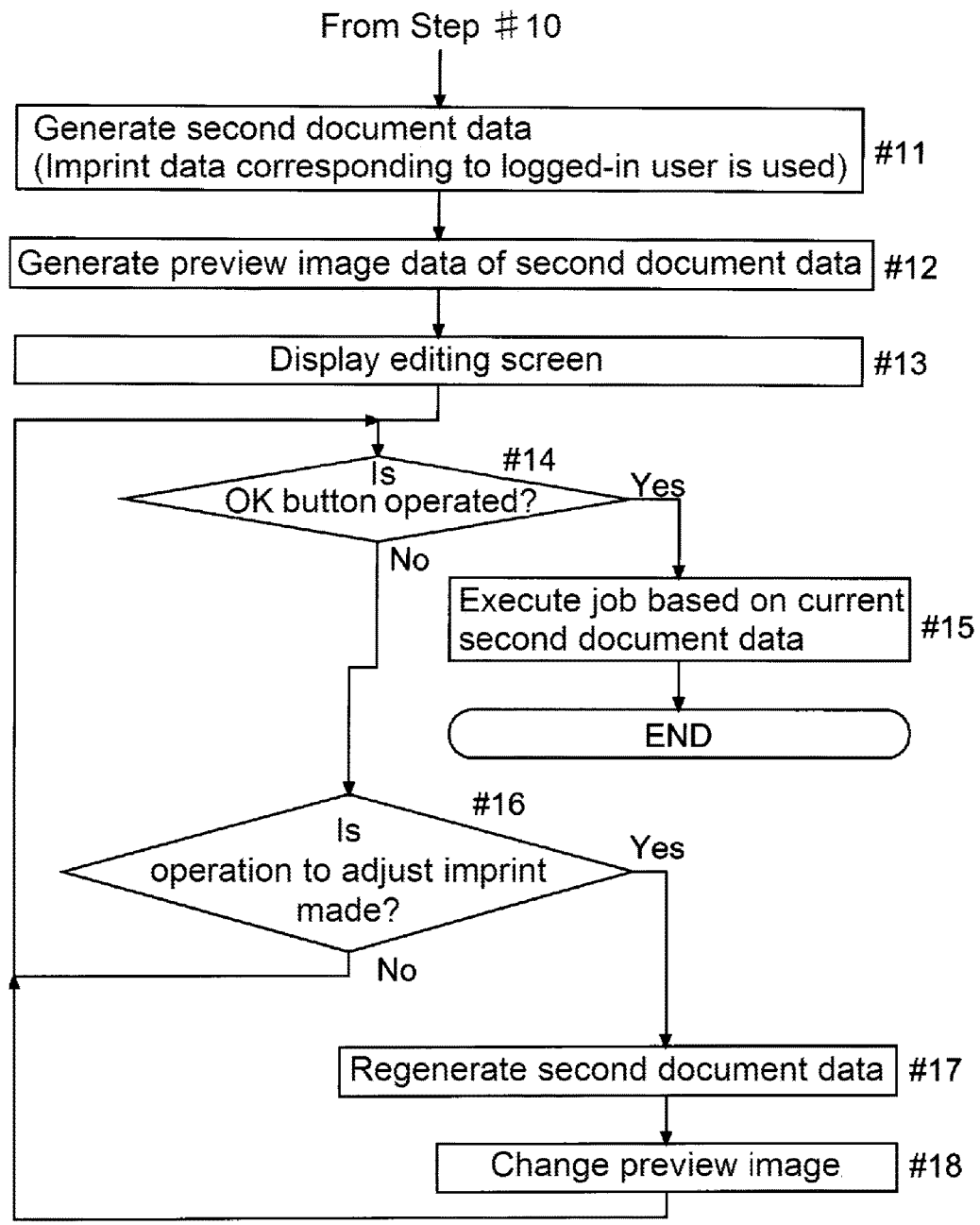
FIG. 7 illustrates an exemplary flow of the process in the job execution with the multifunctional peripheral according to the one embodiment.
Figure 8:
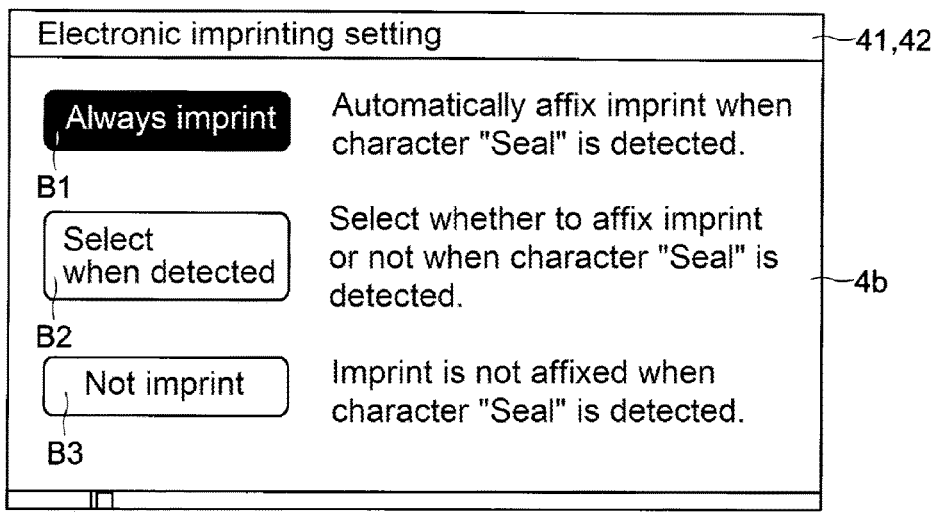
FIG. 8 illustrates an exemplary electronic imprinting setting screen according to the one embodiment.
Figure 9:
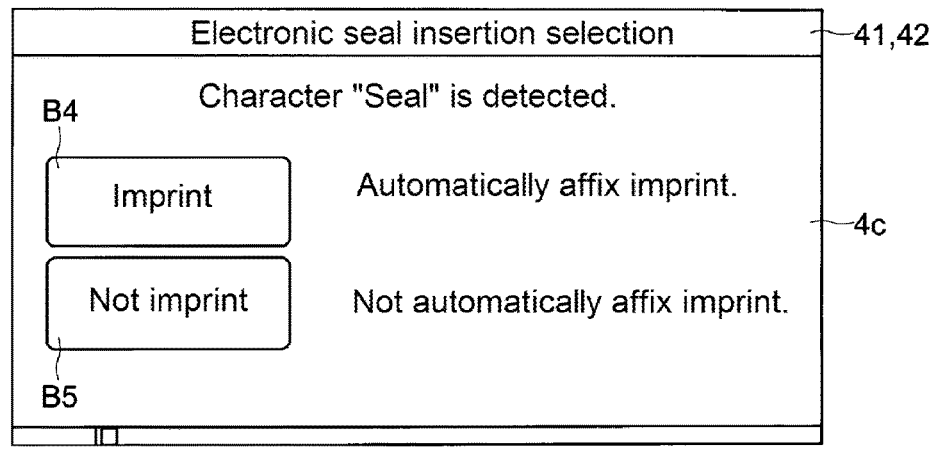
FIG. 9 illustrates an exemplary query screen according to the one embodiment.
Figure 10:
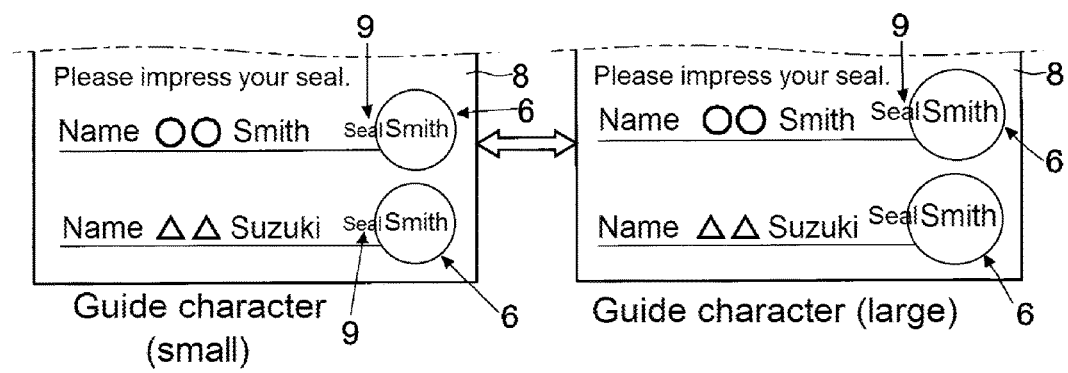
FIG. 10 illustrates an exemplary electronic imprinting process according to the one embodiment.
Figure 12:
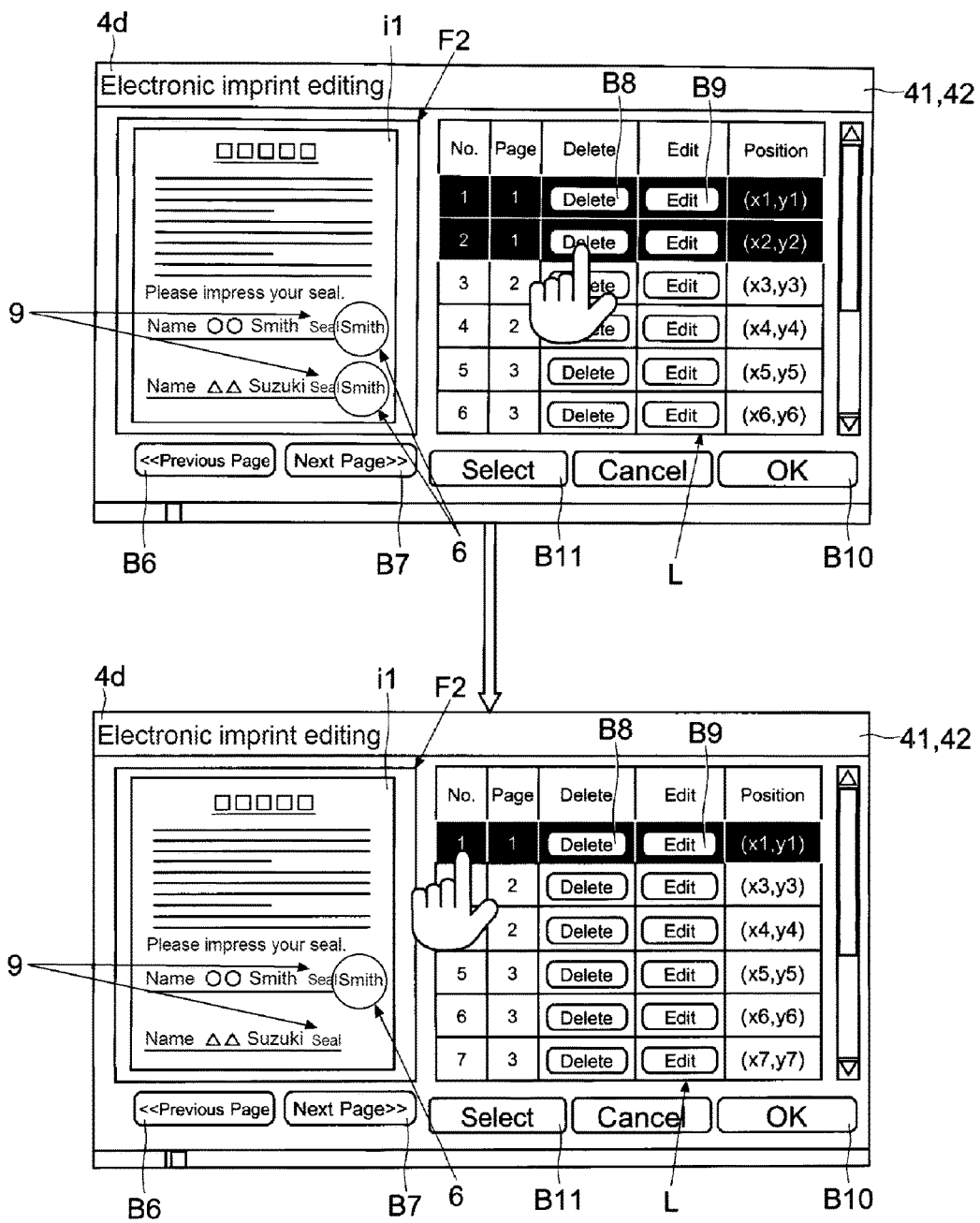
FIG. 12 illustrates an exemplary editing screen according to the one embodiment.
Figure 13:
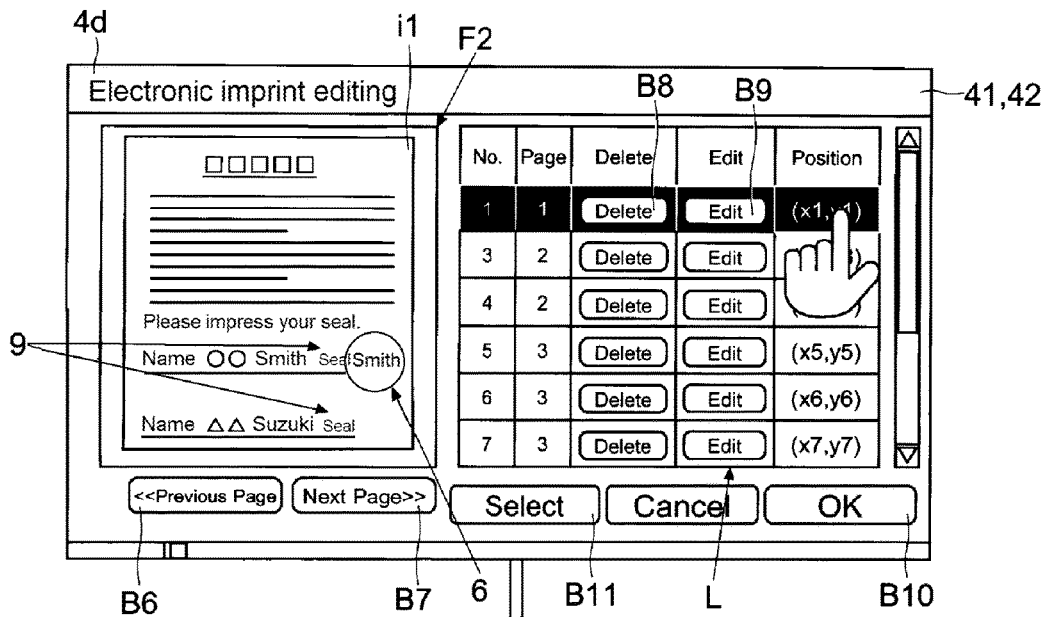
FIG. 13 illustrates an exemplary editing screen according to the one embodiment.
Figure 13:
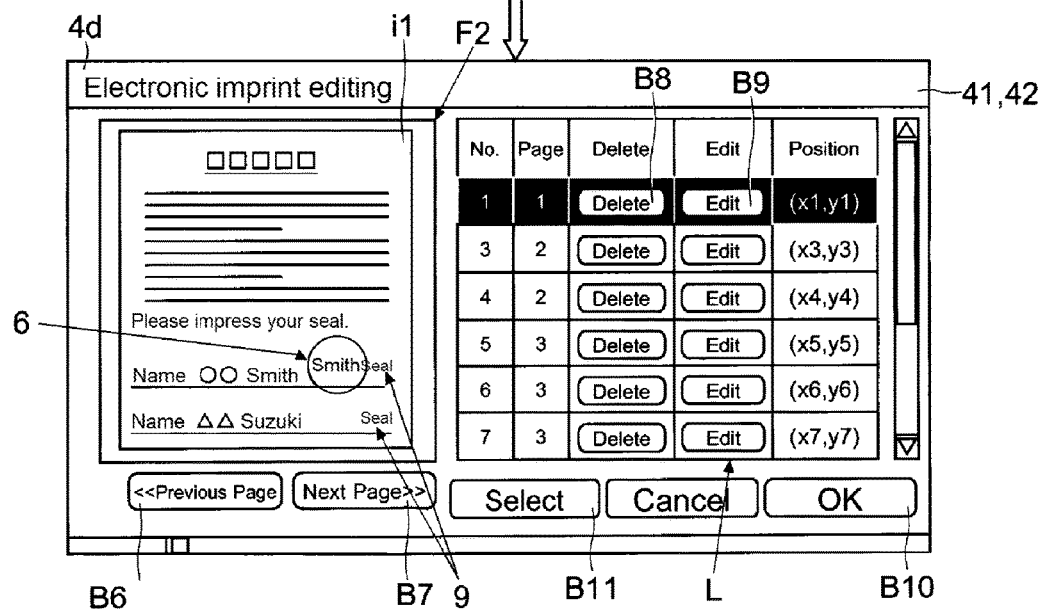
Figure 14:
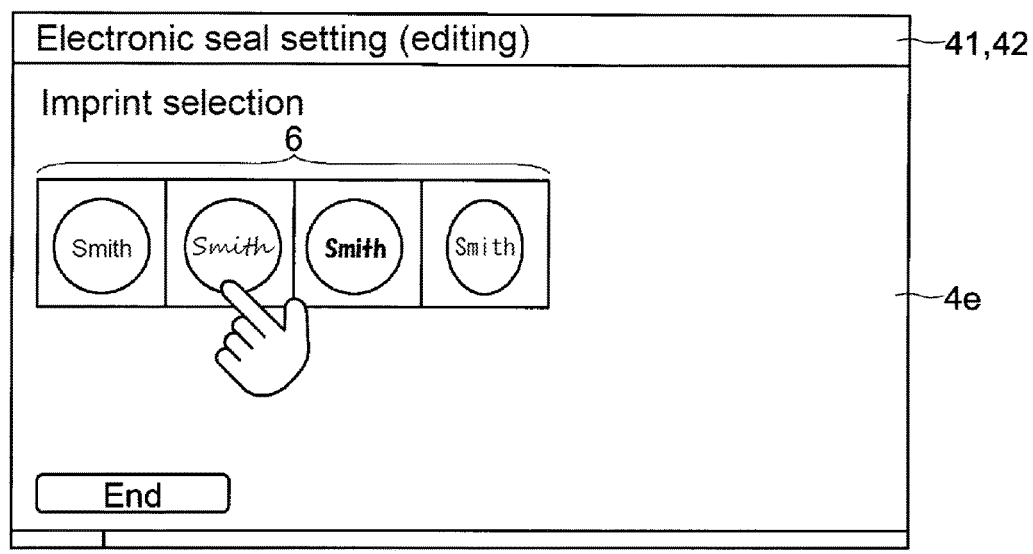
FIG. 14 illustrates an exemplary imprint selection screen according to the one embodiment.
Figure 15:
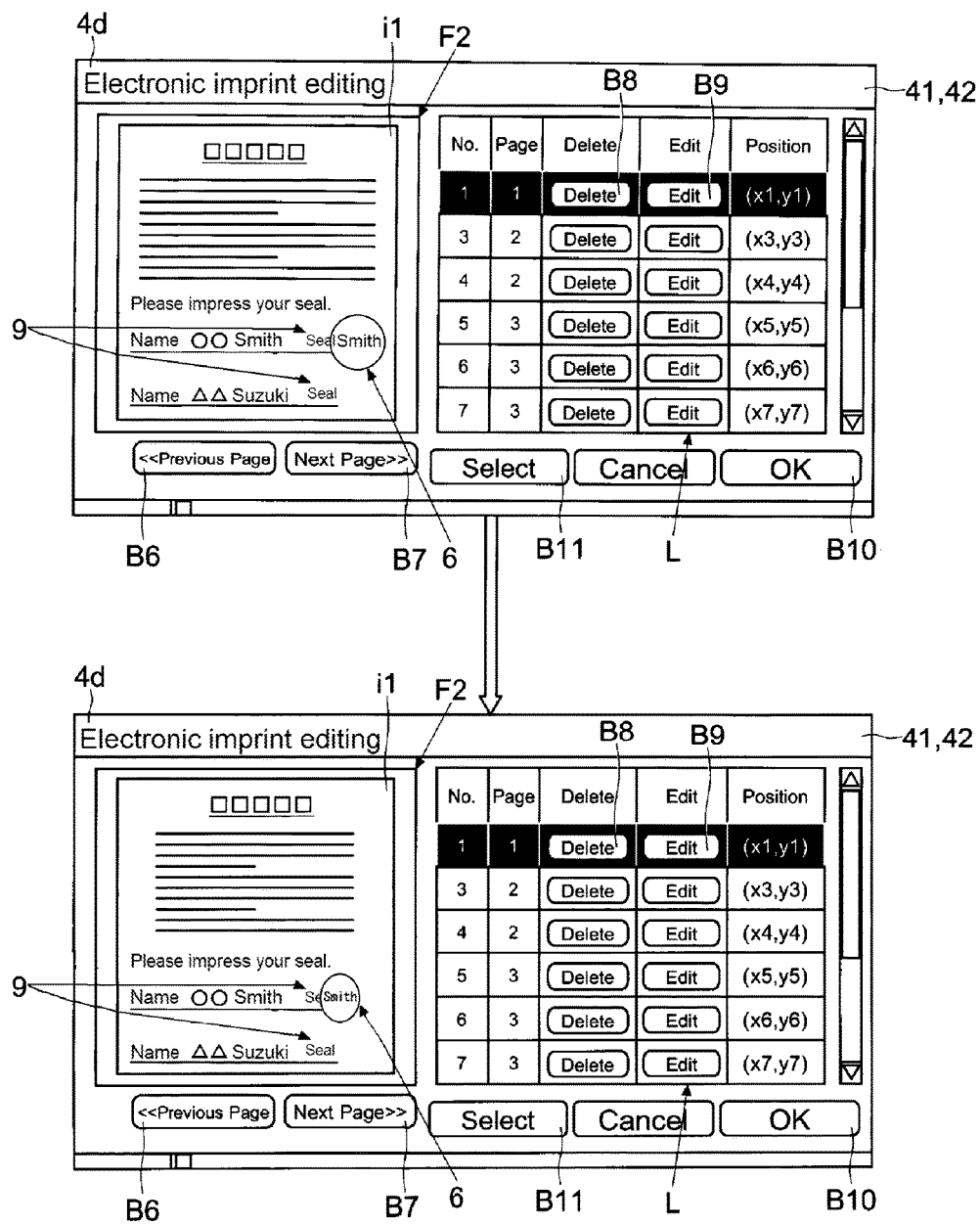
FIG. 15 illustrates an exemplary editing screen according to the one embodiment.

Next, an exemplary flow of a process in a job execution with the multifunctional peripheral 100 according to the embodiment will be illustrated using FIGS. 6 to 15. FIGS. 6 and 7 illustrate exemplary flows of the process in the job execution with the multifunctional peripheral 100 according to the embodiment. FIG. 8 illustrates an exemplary electronic imprinting setting screen 4*b* according to the embodiment. FIG. 9 illustrates an exemplary query screen 4*c* according to the embodiment. FIG. 10 illustrates an exemplary electronic imprinting process according to the embodiment. FIGS. 11 to 13 illustrate an exemplary editing screen 4*d* according to the embodiment. FIG. 14 illustrates an exemplary imprint selection screen 4*e* according to the embodiment. FIG. 15 illustrates an exemplary editing screen 4*d* according to the embodiment.

The start in FIG. 6 is a point when the job execution start command is performed. In other words, the start in FIG. 6 is ae point when the start key is operated. A login is necessary for the job execution start command. The user is authenticated. Therefore, the control unit 1 (the authentication unit) already recognizes the logged-in user. The user has performed various kinds of settings with the operation panel 4.

First, the control unit 1 obtains electronic imprinting setting information 24 of the logged-in user from the storage unit 2 (Step #1, see FIG. 2). The electronic imprinting setting information 24 is data that defines a behavior of the multifunctional peripheral 100 (the control unit 1) when the guide character 9 is detected. The behavior of the multifunctional peripheral 100 (the control unit 1) when the guide character 9 is detected can be preliminarily set with an electronic imprinting setting screen 4*b*. The behavior needs to be set before the job execution. While the user is logged in, the control unit 1 causes the display panel 41 to display the electronic imprinting setting screen 4*b* when an operation to display the electronic imprinting setting screen 4*b* is performed on the operation panel 4.

FIG. 8 illustrates the exemplary electronic imprinting setting screen 4*b*. The electronic imprinting setting screen 4*b* includes a first selection button B1, a second selection button B2, and a third selection button B3. A first selection operation is an operation that touches the first election button B1. A second selection operation is an operation that touches the second selection button B2. A third selection operation is an operation that touches the third election button B3.

The first election button B1 is a button to select automatically affixing the imprint data 6 when the guide character 9 is detected. When the first document data 7 includes the guide character 9 and the first selection operation is preliminarily made, the control unit 1 generates the second document data 8 to which the imprint image (the imprint data 6) is attached at all the positions of the detected guide characters 9.

The second selection button B2 is a button to ensure selecting whether to affix the imprint data 6 or not at each time when the guide character 9 is detected. When the first document data 7 includes the guide character 9 and the second selection operation is preliminarily made, the control unit 1 causes the display panel 41 to display a screen asking a necessity of the imprint data 6 (a query screen 4*c*). FIG. 9 illustrates the exemplary query screen 4*c*.

The query screen 4*c* includes a necessary button B4 and an unnecessary button B5. When the electronic imprinting is necessary, the user operates the necessary button B4. When the electronic imprinting is not necessary, the user operates the unnecessary button B5. When the necessary button B4 is operated, the control unit 1 generates the second document data 8. When the unnecessary button B4 is operated, the control unit 1 does not generate the second document data 8.

The third selection button B3 is a button to select not affixing the imprint data 6 even when the guide character 9 is detected. When the third selection operation is preliminarily made, the control unit 1 does not generate the second document data 8 even when the first document data 7 includes the guide character 9.

The electronic imprinting setting information 24 is information that indicates which selection button is operated on the electronic imprinting setting screen 4*b*. When a button is operated on the electronic imprinting setting screen 4*b*, the control unit 1 causes the storage unit 2 to nonvolatilely store the electronic imprinting setting information 24. The electronic imprinting setting information 24 is stored for each user.

Subsequently, the control unit 1 obtains the first document data 7 (Step #2). In the copy job and the scan transmitting job, the image data obtained by the document reading of the image reading unit 3 is obtained as the first document data 7.

The control unit 1 confirms whether a setting of non-use of electronic imprinting is made or not based on the electronic imprinting setting information 24 (Step #3). In other words, the control unit 1 confirms whether the third selection operation is preliminarily made or not. When the setting of non-use of electronic imprinting is made (Yes at Step #3), this flow is terminated. The control unit 1 (the imprint processing unit 16) does not generate the second document data 8. The control unit 1 executes the job based on the first document data 7.

When a setting of use of the electronic imprinting (the first selection operation or the second selection operation) is made (No at Step #3), the control unit 1 (the recognition processing unit 15) recognizes the character included in the first document data 7 (Step #4). When the first document data 7 includes a plurality of pages, the control unit 1 performs a character recognition process to all the pages.

As a result of the character recognition process, the control unit 1 (the recognition processing unit 15) confirms whether the guide character 9 is detected or not (Step #5). The recognition processing unit 15 detects a character "Seal" having a blank of one or more characters in each of front and back of the guide character as the guide character 9. Even when the character "Seal" is detected, when there is no blank, the recognition processing unit 15 does not detect the character as the guide character 9. The recognition processing unit 15 handles the character "Seal" as a part of a character string. When being a part of the character string, the character "Seal" does not indicate the imprinting position. The blank may have a size specified number or more of characters depending on each language. Specifically, the size of one or more characters may be selected for languages in which words are not separated with space, such as Japanese and Chinese, while the size of three or more may be selected for languages in which words are separated with space, such as English and German.

When even one guide character 9 is not detected (Step #5), the flow is terminated (the end). This is because there is no necessity of affixing the imprint data 6. As a result, the control unit 1 executes the job based on the first document data 7. On the other hand, when even one guide character 9 is detected (Yes at Step #5), the control unit 1 confirms whether there is a necessity of displaying the query screen 4*c* or not (Step #6). In other words, the control unit 1 confirms whether the second selection operation is preliminarily made or not.

When it is necessary to display the query screen 4*c* (Yes at Step #6), the control unit 1 (the imprint processing unit 16) causes the display panel 41 to display the query screen 4*c* (Step #7). When the unnecessary button B5 is operated (Yes at Step #8), the flow selection operation is terminated (the end). As a result, the control unit 1 executes the job based on the first document data 7. In other words, when the selection of not affixing the imprint data 6 is made, the flow is terminated. When the unnecessary button B5 is not operated (No at Step #8), the control unit 1 confirms whether the necessary button B4 is operated or not (Step #9). When the necessary button B4 is not operated (No at Step #9), the flow returns to Step #8.

When there is no necessity of displaying the query screen 4*c* (No at Step #6) and when the necessary button B4 is operated (Yes at Step #9), the control unit 1 determines to perform the automatic electronic imprinting (Step #10, completion of the first stage). That is, when the first selection operation is preliminarily made, the control unit 1 (the imprint processing unit 16) generates the second document data 8. Alternatively, when the second selection operation is preliminarily made and the selection of affixing the imprint data 6 is made, the control unit 1 (the imprint processing unit 16) generates the second document data 8.

The control unit 1 (the imprint processing unit 16) generates the second document data 8 (Step #11, transition to FIG. 7, the second stage). Specifically, the control unit 1 copies the first document data 7. The control unit 1 handles the first document data 7 as original image data. The control unit 1 affixes the imprint data 6 to the copied image data. The imprint processing unit 16 attaches (overlays) the imprint image (the imprint data 6) at the position of the guide character 9. The control unit 1 (the imprint processing unit 16) attaches the imprint image (the imprint data 6) of the logged-in user at the position of the guide character 9. When the plurality of imprint data 6 are stored for the logged-in user, the control unit 1 uses the default imprint data 6. Thus, the control unit 1 generates the copy of the first document data 7 to which the imprint data 6 is affixed as the second document data 8. The second document data 8 generated by the control unit 1 is stored in the storage unit 2.

As illustrated in FIG. 10, the control unit 1 (the imprint processing unit 16) generates the second document data 8 to which the imprint image (the imprint data 6) that increases in size is affixed as the guide character 9 (the character, Seal) increases in size (see drawing on the right in FIG. 10). The control unit 1 generates the second document data 8 to which the imprint image (the imprint data 6) that decreases in size is affixed as the guide character 9 decreases in size (see drawing on the left in FIG. 10). Therefore, the control unit 1 (the recognition processing unit 15) recognizes a size of the guide character 9 (the character, Seal). For example, magnification data 23 that defines a magnification with respect to the size of the detected guide character 9 is stored (see FIG. 1). The magnification data 23 is defined such that the magnification increases as the guide character 9 increases in size. The control unit 1 (the imprint processing unit 16) recognizes the magnification that corresponds to the size of the guide character 9 based on the magnification data 23. The control unit 1 enlarges or reduces the imprint image (the imprint data 6) by the recognized magnification. There is a case of the same magnification depending on the size of the guide character 9. The control unit 1 affixes the imprint image (the imprint data 6) after being enlarged or reduced to the copied data of the first document data 7.

Attaching method of the imprint image (the imprint data 6) is not particularly restricted. The control unit 1 may attach the imprint image (the imprint data 6) such that a center of the imprint image (the imprint data 6) coincides with a center of the guide character 9. The control unit 1 may attach the imprint image (the imprint data 6) so as to partly overlap the guide character 9.

When the second document data 8 is generated, the control unit 1 (the imprint processing unit 16) causes the preview processing unit 17 to generate the preview image data 25 of the second document data 8 (Step #12, end of the second stage). This is to display the preview image i1 of the second document data 8.

The control unit 1 causes the display panel 41 to display an editing screen 4d (Step #13, start of the third stage). FIG. 11 illustrates the exemplary editing screen 4d. On a left side of the editing screen 4d in FIG. 11, a preview display area F2 is located. The control unit 1 causes the preview display area F2 to display the preview image i1. The control unit 1 causes to display an image showing a job result based on the second document data 8. Below the preview display area F2, a previous page button B6 and a next page button B7 are located. When the job includes a plurality of pages, the previous page button B6 and the next page button B7 ensure displaying the preview image i1 on the previous page or the next page.

The preview image i1 in FIG. 11 illustrates an example where two guide characters 9 are included in the first document data 7. In the preview image i1 in FIG. 11, the two imprint images (the imprint data 6) are affixed so as to overlap the respective guide characters 9.

On a right side of the editing screen 4d in FIG. 11, a list L is located. One line of the list L corresponds to one imprint data 6. In the list L, the leftmost column shows numbers (orders). The second column from the left shows pages to which the imprint images (the imprint data 6) are affixed. The third column from the left includes delete buttons B8. The fourth column from the left includes edit buttons B9. In the rightmost column, positions (coordinates) where the imprint images (the imprint data 6) are affixed are listed. For example, center coordinates of the imprint images (the imprint data 6) are displayed.

The row corresponding to the imprint image (the imprint data 6) affixed to the currently displayed preview image i1 (the page) is in a black-and-white (light-and-dark) inversion state. In the example in FIG. 11, the control unit 1 causes the first line and the second line to be in the black-and-white inversion state in the list L. The first line corresponds to the imprint image (the imprint data 6) in an upper side in the preview image i1. The second line corresponds to the imprint image (the imprint data 6) in a lower side in the preview image i1. Confirming the page and the position (the coordinate) ensures determining which row corresponds to which imprint.

The user confirms the preview images i1 of the respective pages. When the job execution according to the content on the preview image i1 is fine, the user operates an OK button B10. Therefore, the control unit 1 confirms whether the OK button B10 is operated or not (Step #14). In other words, the control unit 1 confirms whether an operation that approves the job execution is accepted or not.

When the OK button B10 is operated (Yes at Step #14), the control unit 1 executes the job based on the current second document data 8 (Step #15). In the case of the copy job and the box print job, the control unit 1 causes the printing unit 5 to print based on the current second document data 8. In the case of the scan transmitting job and the box transmitting job, the control unit 1 causes the communication unit 13 to transmit the current second document data 8.

Here, the editing screen 4d can adjust the imprint. The adjustment can delete the imprint, move the imprint, and change the imprint. The control unit 1 confirms whether an operation to adjust the imprint is made or not (Step #16). In other words, the control unit 1 confirms whether the delete operation, the move operation, or the operation to change the imprint is made or not.

When the operation to adjust the imprint is not made (No at Step #14), the flow returns to Step #14. The confirmations of the operation of the OK button B10 and the presence/absence of the imprint adjustment are repeated. When the operation to adjust the imprint is made (Yes at Step #16), the control unit 1 regenerates the second document data 8 (Step #17). Then, based on the regenerated second document data 8, the control unit 1 (the preview processing unit 17) changes the preview image i1 to display (Step #18).

(1) Delete of Imprint

When the imprint is deleted, the user operates the delete button B8 that corresponds to the imprint desired to be deleted. In other words, the user touches the delete button B8 on a row that corresponds to the imprint desired to be deleted in the list L. In FIG. 11, two imprints are affixed to the preview image i1. The name in the imprint in the lower side and a name (Suzuki) of the person who imprints do not match. When the imprint in the lower side in the preview image i1 is desired to be deleted, the user operates the delete button B8 on the second row in the list L.

That is, the touch panel 42 accepts the delete operation of the imprint image (the imprint data 6). When the delete operation is made (Yes at Step #16), the control unit 1 (the imprint processing unit 16) regenerates the second document data 8. Specifically, the control unit 1 discards the current (already-generated) second document data 8. The control unit 1 copies the first document data 7 again. The control unit 1 affixes only the imprint image (the imprint data 6) that is not instructed to be deleted to the recopied data. The control unit 1 newly generates the second document data 8 to which the imprint image (the imprint data 6) that is instructed to be deleted by the delete operation is not affixed and the imprint image (the imprint data 6) that is not instructed to be deleted is affixed.

When the second document data 8 is regenerated, the control unit 1 (the preview processing unit 17) causes the display panel 41 to change the preview image i1 to display. In this case, the preview processing unit 17 generates the preview image data 25 of the regenerated second document data 8. Then, the control unit 1 causes the display panel 41 to display the preview image i1 based on the regenerated preview image data 25. When the second document data 8 is regenerated based on the delete operation, the preview image i1 on which the delete of the imprint is reflected is displayed. FIG. 12 illustrates an exemplary change of the preview image i1 based on the delete of the imprint data 6. FIG. 12 illustrates that a count of the imprint has changed (reduced) by the delete of the imprint data 6 in the lower side.

(2) Move of Imprint

When the imprint is moved, the user operates a display field of a coordinate of the imprint desired to move in the list L. When a coordinate field is touched, for example, the control unit 1 causes to display a move setting screen (not illustrated). The user inputs a moving direction and a moving amount into the move setting screen. That is, the touch panel 42 accepts the move operation. The move operation is an operation that instructs moving the imprint image (the imprint data 6) in the second document data 8.

When the move operation is made (Yes at Step #16), the control unit 1 (the imprint processing unit 16) also regenerates the second document data 8. Specifically, the control unit 1 discards the current (already-generated) second document data 8. The control unit 1 recopies the first document data 7. In the recopied data, the control unit 1 affixes the imprint image (the imprint data 6) at a set position.

When the second document data 8 is regenerated by the move operation, the control unit 1 (the preview processing unit 17) causes the display panel 41 to change the preview image i1 to display. In this case, the preview processing unit 17 generates the preview image data 25 of the regenerated second document data 8. Then, the control unit 1 causes the display panel 41 to display the preview image i1 based on the regenerated preview image data 25. When the second document data 8 is regenerated based on the move operation, the preview image i1 on which the move of the imprint is reflected is displayed. FIG. 13 illustrates an exemplary change of the preview image i1 by the move of the imprint. FIG. 13 illustrates an example where a position of the imprint image (the imprint data 6) is shifted by the move operation. With respect to the position of the imprint image (the imprint data 6) in a top view in FIG. 13, the position of the imprint image (the imprint data 6) in a bottom view in FIG. 13 is shifted in a left direction.

(3) Change of Imprint

There is a case where the imprint itself is desired to be changed. When changing into an imprint already registered, the user operates (touches) a selection button. The selection button is located in the lower side of the list L. When the selection button is touched, the control unit 1 causes the display panel 41 to display an imprint selection screen 4e. FIG. 14 illustrates the exemplary imprint selection screen 4e. As illustrated in FIG. 14, the control unit 1 causes the imprint selection screen 4e to display the already registered imprint images (the imprint data 6) of the logged-in user. The user operates (touches) the imprint image (imprint data 6) desired to use. The touch panel 42 accepts the imprint selection operation. The imprint selection operation is an operation to select the imprint data 6 to be used among the imprint data 6 stored in the storage unit 2.

It is possible to change to a newly generated imprint. When desiring to create a new imprint, the user operates an edit button B9. When the edit button B9 is operated, the control unit 1 causes the display panel 41 to display the imprint creation screen 4a illustrated in FIG. 3. Similarly to when the imprint data 6 is registered, the user can set a name, a size of an imprint, a font of the name, a shape of the imprint (a frame border), and a transparency.

On the imprint creation screen 4a, the touch panel 42 accepts an operation (a size setting operation) to set the name in the imprint. The touch panel 42 accepts an operation (the size setting operation) to set the size of the imprint. The touch panel 42 accepts an operation (a font setting operation) to set the font of the imprint. The touch panel 42 accepts an operation (a shape setting operation) to set the shape of the imprint. The touch panel 42 accepts a transparency operation and a nontransparency operation.

The control unit 1 (the imprint processing unit 16) newly generates the imprint data 6 having the set name, the set size, the set font, the set shape, and the set transparency. The control unit 1 may cause the storage unit 2 to store the newly generated imprint data 6 as the imprint data 6 of the logged-in user. The control unit 1 may handle the newly generated imprint data 6 as the default imprint data 6.

Thus, the imprint can be changed. When the imprint selection operation is made (Yes at Step #16), the control unit 1 generates the second document data 8 to which the imprint image (the imprint data 6) selected by the imprint selection operation is affixed. When the new imprint data 6 is generated (Yes at Step #16), the control unit 1 generates the second document data 8 to which the newly generated imprint image (the imprint data 6) is affixed.

A seal (a stamp) used in one document is usually identical. Therefore, when the imprint selection operation is made or when the imprint data 6 is newly generated, the second document data 8 of all the pages may be regenerated. In this case, the control unit 1 (the imprint processing unit 16) discards all the pages of the current second document data 8. The control unit 1 copies all the pages of the first document data 7. The control unit 1 affixes the selected or the newly generated imprint image (the imprint data 6) at the position of the guide character 9 in the copied data. The control unit 1 regenerates the second document data 8 of all the pages.

Only the imprint that corresponds to the operated edit button B9 may be replaced with the newly generated imprint data 6. In this case, the control unit 1 (the imprint processing unit 16) discards the page including the imprint image (the imprint data 6) for which the edit button B9 is operated in the second document data 8. The control unit 1 copies the discarded page in the first document data 7. The control unit 1 affixes the newly generated imprint image (the imprint data 6) at the position of the guide character 9 in the copied data. The control unit 1 regenerates a part of the image data in the second document data 8.

Also, when the second document data 8 is regenerated by the change of the imprint, the control unit 1 (the preview processing unit 17) generates the preview image data 25 of the regenerated second document data 8. The preview image i1 on which the change of the imprint is reflected is displayed. FIG. 15 illustrates an exemplary change of the preview image i1 based on the change of the imprint.

Thus, the electronic imprinting device (the multifunctional peripheral 100) according to the embodiment includes the display (the display panel 41), the operation unit (the touch panel 42 and the hardware key 43), the recognition processing unit 15, the storage unit 2, and the imprint processing unit 16. The display displays. The operation unit accepts the operation of the user. The recognition processing unit 15 recognizes the character included in the first document data 7 and detects the guide character 9 indicating the imprinting position. The storage unit 2 stores the imprint data 6 representing the imprint. When the recognition processing unit 15 recognizes that the first document data 7 includes the guide character 9, the imprint processing unit 16 generates the second document data 8 that includes a content of the first document data 7 and is data in which the imprint image (the imprint data 6) is affixed at the position of the guide character 9.

This ensures automatically and rapidly detecting the position (the imprinting position) to affix the imprint image (the imprint data 6) in the document data. In other words, the imprinting position of the electronic seal (the electronic stamp and the electronic signet) can be automatically and rapidly detected. The user does not need to search for the imprinting position. Then, the imprint image (the imprint data 6) is automatically affixed to the detected imprinting position. The imprint image (the imprint data 6) is attached at the position of the guide character 9. The imprint image (the imprint data 6) is affixed to an appropriate position. Therefore, the user does not need to perform a position adjustment operation of the attached imprint image (the imprint data 6). The user does not need to perform a burdensome operation. Accordingly, the imprint data 6 (the electronic seal) can be efficiently affixed to the document data. A convenient electronic imprinting device can be provided.

The recognition processing unit 15 detects the character "Seal" having a blank of one or more characters in the front and the back as the guide character 9. This ensures accurately detecting the position to affix the imprint image (the imprint data 6). The recognition processing unit 15 does not detect the character "Seal" that does not mean the imprinting position as the guide character 9.

The recognition processing unit 15 recognizes the size of the guide character 9. The imprint processing unit 16 generates the second document data 8 to which the imprint image (the imprint data 6) that increases in size is affixed as the guide character 9 increases in size. The imprint processing unit 16 generates the second document data 8 to which the imprint image (the imprint data 6) that decreases in size is affixed as the guide character 9 decreases in size. This ensures automatically adjusting the size of the imprint data 6 (the electronic seal). There is no need for adjusting the size of the imprint every time.

The operation unit accepts the first selection operation, the second selection operation, and the third selection operation. When the first document data 7 includes the guide character 9 and the first selection operation is preliminarily made, the imprint processing unit 16 generates the second document data 8 to which the imprint image (the imprint data 6) is affixed at all the positions of the detected guide characters 9. When the first document data 7 includes the guide character 9 and the second selection operation is preliminarily made, the imprint processing unit 16 causes the display to display the screen asking the necessity of the imprint data 6. When the operation unit accepts the operation that demands imprinting, the imprint processing unit 16 generates the second document data 8. When the operation unit accepts the operation that does not demand imprinting, the imprint processing unit 16 does not generate the second document data 8. When the first document data 7 includes the guide character 9 and the third selection operation is preliminarily made, the imprint processing unit 16 does not generate the second document data 8. This ensures preliminarily set the behavior of the electronic imprinting device when the guide character 9 is detected. The electronic imprinting device can be caused to operate according to the user wishes. The convenient electronic imprinting device can be provided.

When the operation unit accepts the delete operation that instructs deleting the imprint data 6 in the second document data 8, the imprint processing unit 16 newly generates the second document data 8 to which the imprint image (the imprint data 6) instructed to be deleted by the delete operation is not affixed and the imprint image (the imprint data 6) not instructed to be deleted is affixed. This ensures easily deleting the unnecessary imprint data 6 (electronic seal). In conjunction with the deletion of the imprint data 6, the second document data 8 is automatically regenerated. The regeneration of the second document data 8 does not require work.

When the operation unit accepts the move operation that instructs moving the imprint image (the imprint data 6) in the second document data 8, the imprint processing unit 16 generates the second document data 8 in which the imprint image (the imprint data 6) is located at the position set by the move operation. This ensures affixing the imprint at a desired position. The position of the imprint image (the imprint data 6) can be shifted. The imprinting position is finely adjustable.

When the operation unit accepts the imprint selection operation that selects the imprint data 6 to be used among the imprint data 6 stored in the storage unit 2, the imprint processing unit 16 generates the second document data 8 to which the imprint image (the imprint data 6) selected by the imprint selection operation is affixed. This ensures selecting the imprint to affix to the document data. The desired imprint data 6 is selectable. The imprint (the stamp) that suits the document is selectable.

When the operation unit accepts the size setting operation that sets the size of the imprint, the imprint processing unit 16 generates the second document data 8 to which the imprint image (the imprint data 6) having the size set by the size setting operation is affixed. This ensures adjusting the size of the imprint to affix to the document data. The size of the imprint (the stamp) is changeable to suit the document.

When the operation unit accepts the font setting operation that sets the font of the imprint, the imprint processing unit 16 generates the second document data 8 to which the imprint image (the imprint data 6) having the font set by the font setting operation is affixed. This ensures selecting the font of the imprint to affix to the document data. The font of the character in the imprint can be set to a desired font. The font of the imprint (the stamp) is changeable to suit the document.

When the operation unit accepts the shape setting operation that sets the shape of the imprint, the imprint processing unit 16 generates the second document data 8 to which the imprint image (the imprint data 6) having the shape set by the shape setting operation is affixed. This ensures selecting the shape of the imprint to affix to the document data. An imprint having a desired shape from shapes, such as a round shape and a square shape, can be affixed. The shape of the imprint (the stamp) is changeable to suit the document.

The operation unit accepts the transparency operation and the nontransparency operation. When the transparency operation is made, the imprint processing unit 16 generates the second document data 8 to which the transparent imprint image (the imprint data 6) is attached at the position of the guide character 9. When the nontransparency operation is made, the imprint processing unit 16 generates the second document data 8 to which the nontransparent imprint image (the imprint data 6) is attached at the position of the guide character 9. This ensures selecting the transparency or nontransparency of the imprint.

The electronic imprinting device includes the authentication information input unit (the operation panel 4 and the card reader 14) into which the authentication information 21 for authenticating the user is input and the authentication unit (the control unit 1) that authenticates the user attempting to log in based on the authentication information 21 input into the authentication information input unit. The storage unit 2 stores the imprint data 6 for each user. The imprint processing unit 16 generates the second document data 8 to which the imprint image (the imprint data 6) that corresponds to the logged-in user is attached at the position of the guide character 9. This automatically uses the imprint data 6 corresponding to the current user. The imprint data 6 of another person can be protected from being used.

The electronic imprinting device includes the preview processing unit 17 that causes the display to display the preview image i1 that shows the job result of the second document data 8. This ensures confirming what sort of imprint is affixed to which position in the document data with the preview image i1.

The electronic imprinting device includes the printing unit 5 that performs printing based on the second document data 8. This ensures performing printing based on the document data to which the imprint is affixed. An imprinted printed matter is easily obtainable.

The disclosure is applicable to an electronic imprinting device that affixes an imprint to document data. An imprint and an imprint image have a broad meaning and include a signature and a signature image, respectively.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic imprinting device comprising:
a display that performs a display;
an operation unit that accepts an operation of a user;
a recognition processing unit that recognizes a character included in first document data and detects a guide character that indicates an imprinting position;
a storage unit that stores imprint data representing an imprint; and
an imprint processing unit that, when the recognition processing unit recognizes that the first document data includes the guide character, generates second document data as data to which an imprint image represented by the imprint data is affixed at a position of the guide character, the second document data including a content of the first document data,
wherein:
the operation unit accepts a first selection operation, a second selection operation, and a third selection operation;
when the first document data includes the guide character and the first selection operation is preliminarily made, the imprint processing unit generates the second document data to which the imprint image represented by the imprint data is affixed at the positions of all the detected guide characters;
when the first document data includes the guide character and the second selection operation is preliminarily made, the imprint processing unit causes the display to display a screen asking a necessity of the imprint data;
when the operation unit accepts an operation that demands imprinting, the imprint processing unit generates the second document data; and
when the first document data includes the guide character and the third selection operation is preliminarily made, the imprint processing unit does not generate the second document data.

2. An electronic imprinting device comprising:
a display that performs a display;
an operation unit that accepts an operation of a user;
a recognition processing unit that recognizes a character included in first document data and detects a guide character that indicates an imprinting position;
a storage unit that stores imprint data representing an imprint; and
an imprint processing unit that, when the recognition processing unit recognizes that the first document data includes the guide character, generates second document data as data to which an imprint image represented by the imprint data is affixed at a position of the guide character, the second document data including a content of the first document data,
wherein:
when the operation unit accepts a delete operation that instructs deleting the imprint image represented by the imprint data in the second document data, the imprint processing unit newly generates the second document data to which the imprint image represented by the imprint data instructed to be deleted by the delete operation is not affixed and the imprint image represented by the imprint data not instructed to be deleted is affixed.

3. An electronic imprinting device comprising:
a display that performs a display;
an operation unit that accepts an operation of a user;
a recognition processing unit that recognizes a character included in first document data and detects a guide character that indicates an imprinting position;
a storage unit that stores imprint data representing an imprint; and
an imprint processing unit that, when the recognition processing unit recognizes that the first document data includes the guide character, generates second document data as data to which an imprint image represented by the imprint data is affixed at a position of the guide character, the second document data including a content of the first document data,
wherein:
when the operation unit accepts an imprint selection operation that selects the imprint data to be used among the imprint data stored in the storage unit, the imprint processing unit generates the second document data to which the imprint image represented by the imprint data selected by the imprint selection operation is affixed.

4. The electronic imprinting device according to claim 3, wherein:
when the operation unit accepts a size setting operation that sets a size of the imprint, the imprint processing unit generates the second document data to which the imprint image having the size set by the size setting operation is affixed, the imprint image being represented by the imprint data.

5. The electronic imprinting device according to claim 3, wherein:
when the operation unit accepts a font setting operation that sets a font of the imprint, the imprint processing unit generates the second document data to which the imprint image having the font set by the font setting operation is affixed, the imprint image being represented by the imprint data.

6. The electronic imprinting device according to claim 3, wherein:
when the operation unit accepts a shape setting operation that sets a shape of the imprint, the imprint processing unit generates the second document data to which the imprint image having the shape set by the shape setting operation is affixed, the imprint image being represented by the imprint data.

7. The electronic imprinting device according to claim 3, wherein:
the operation unit accepts a transparency operation and a nontransparency operation;
when the transparency operation is made, the imprint processing unit generates the second document data to which the imprint data that represents a transparent imprint image is attached at the position of the guide character; and
when the nontransparency operation is made, the imprint processing unit generates the second document data to which the imprint data that represents a nontransparent imprint image is attached at the position of the guide character.

8. The electronic imprinting device according to claim 3, further comprising:

an authentication information input unit into which authentication information for authenticating a user is input; and an authentication unit that authenticates a user attempting to log in based on the authentication information input into the authentication information input unit; wherein the storage unit stores the imprint data for each user, and the imprint processing unit generates the second document data to which the imprint data that represents the imprint image corresponding to a logged-in user is attached at the position of the guide character.

9. The electronic imprinting device according to claim 3, further comprising a preview processing unit that causes the display to display a preview image showing a job result of the second document data.

10. The electronic imprinting device according to claim 3, further comprising a printing unit that prints based on the second document data.

11. The electronic imprinting device according to claim 3, wherein the recognition processing unit detects a predetermined character having a blank of specified number or more of characters in each of front and back of the guide character as the guide character.

12. The electronic imprinting device according to claim 3, wherein:

the recognition processing unit recognizes a size of the guide character;

the imprint processing unit generates the second document data to which the imprint data representing an imprint image that increases in size is affixed as the guide character increases in size; and the imprint processing unit generates the second document data to which the imprint data representing an imprint image that decreases in size is affixed as the guide character decreases in size.

13. The electronic imprinting device according to claim 3, wherein:

when the operation unit accepts a move operation that instructs moving the imprint image represented by the imprint data in the second document data, the imprint processing unit generates the second document data to which the imprint image represented by the imprint data is located at a position set by the move operation.

* * * * *